US 7,646,887 B2
Jan. 12, 2010

(54) OPTICAL FLOW FOR OBJECT RECOGNITION

(75) Inventors: Luis Goncalves, Pasadena, CA (US); Isaac Gremmer, Pasadena, CA (US)

(73) Assignee: Evolution Robotics Retail, Inc., Pasadena, CA (US)

( * ) Notice: Subject to any disclaimer, the term of this patent is extended or adjusted under 35 U.S.C. 154(b) by 717 days.

(21) Appl. No.: 11/324,957

(22) Filed: Jan. 3, 2006

(65) Prior Publication Data

US 2006/0147087 A1 Jul. 6, 2006

Related U.S. Application Data

(60) Provisional application No. 60/641,427, filed on Jan. 4, 2005.

(51) Int. Cl.
*G06K 9/00* (2006.01)
*G06K 15/00* (2006.01)
(52) U.S. Cl. ...................................... 382/103; 235/383
(58) Field of Classification Search ................. 382/100, 382/103, 107, 135, 173; 348/169; 194/905; 340/555, 556, 557, 568.5, 568.6; 235/383
See application file for complete search history.

(56) References Cited

U.S. PATENT DOCUMENTS

| 4,816,906 A | * | 3/1989 | Kummerfeldt et al. ... 348/402.1 |
| 5,193,001 A | * | 3/1993 | Kerdranvrat ................. 348/701 |
| 5,287,266 A | * | 2/1994 | Malec et al. ................... 705/1 |
| 6,741,177 B2 | * | 5/2004 | Ballantyne ............... 340/568.5 |
| 7,100,824 B2 | * | 9/2006 | Ostrowski et al. ............ 235/383 |
| 2006/0120624 A1 | * | 6/2006 | Jojic et al. .................. 382/284 |

* cited by examiner

*Primary Examiner*—Abolfazl Tabatabai
(74) *Attorney, Agent, or Firm*—Andrew S. Naglestad

(57) ABSTRACT

Disclosed is a system and method for using optical flow to detect objects moving past a camera and to select images of the moving objects. A shopping cart, for example, may be detected by subdividing an image into a plurality of image blocks; comparing the blocks to a preceding image to determine the motion of the portion of the object pictured; associating the most common motion with the shopping cart. The motion of the cart may also be integrated over time for purposes of tracking cart motion and selecting a subset of the captured images for object recognition processing. Detection of the cart and image selection improves computational efficiency an increase merchandise throughput.

25 Claims, 12 Drawing Sheets

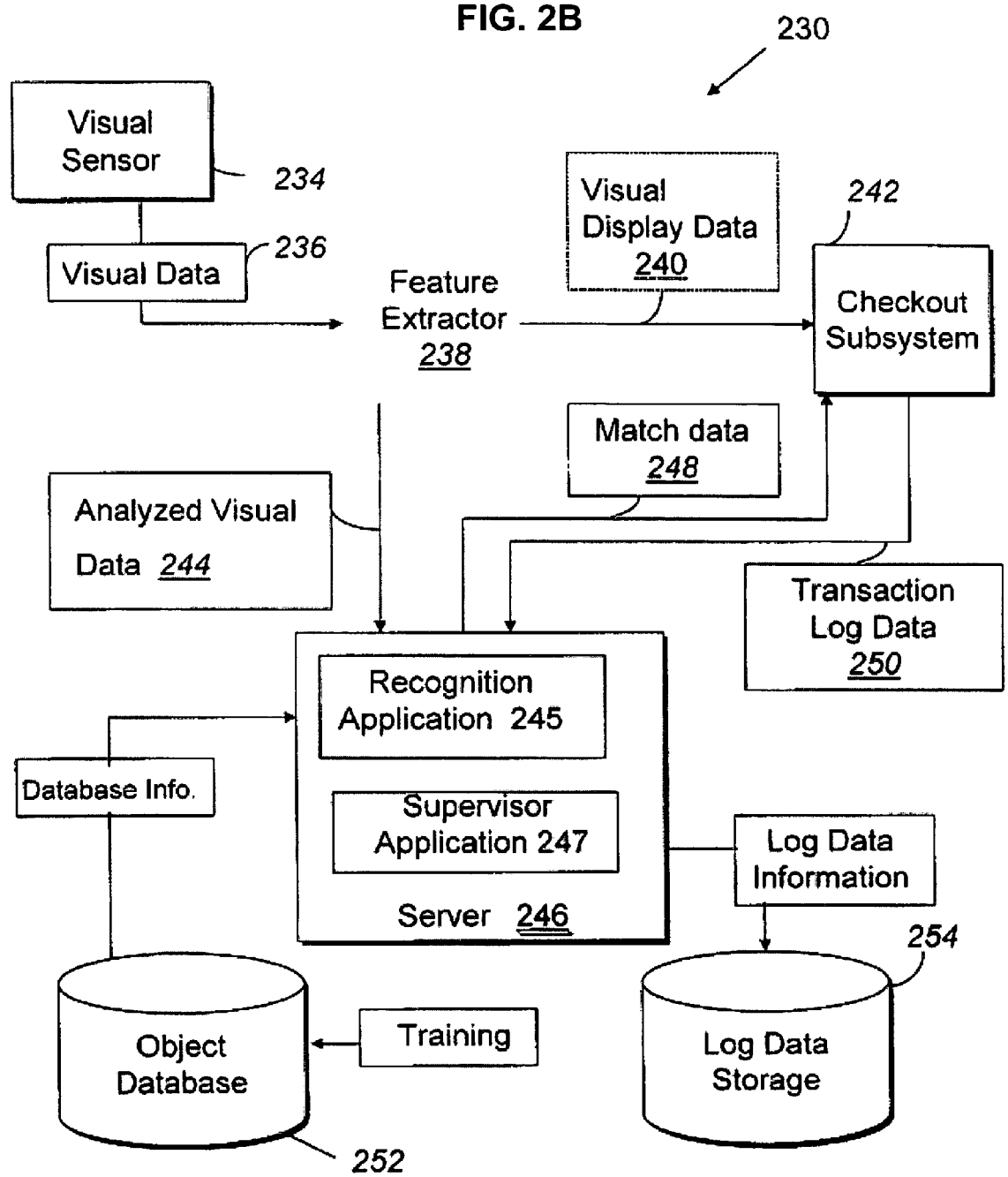

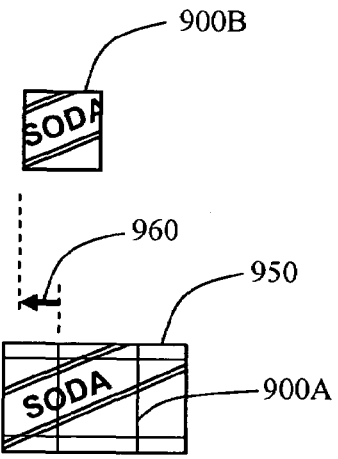
FIG. 9A
FIG. 9B
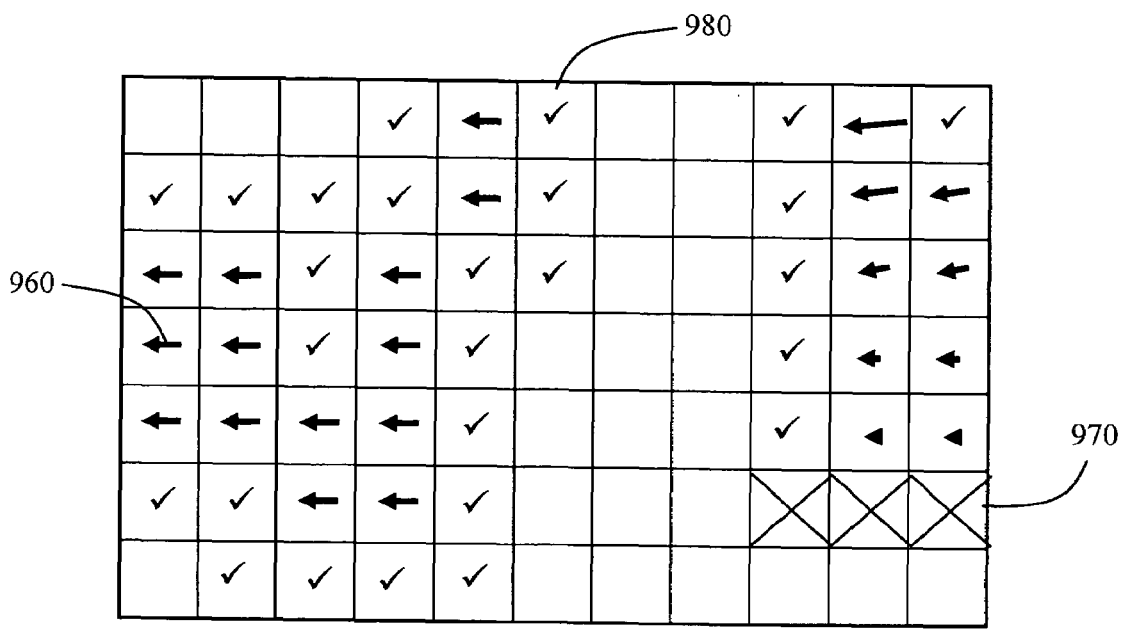
FIG. 10

OPTICAL FLOW FOR OBJECT RECOGNITION

CROSS REFERENCE TO RELATED APPLICATIONS

This application claims the benefit of U.S. Provisional Application No. 60/641,427 filed on Jan. 4, 2005, which is hereby incorporated herein by reference in its entirety.

BACKGROUND OF THE INVENTION

The present invention generally relates to optical flow as it relates to pattern recognition and, more particularly, to systems and method for automatically using optical flow to select images of interest in order to detect objects, for example, in merchandise check out.

In many retail store environments, such as in grocery stores, department stores, office supply stores, home improvements stores, and the like, consumers use shopping carts to carry merchandise. A typical shopping cart includes a basket that is designed for storage of the consumer's merchandise. At times, a consumer will use the lower shelf space located below the shopping cart basket as additional storage space, especially for relatively large and/or bulky merchandise.

On occasion, when a consumer uses the lower shelf space to carry merchandise, the consumer can leave the store without paying for the merchandise on the lower shelf space. This may occur because the consumer inadvertently forgets to present the merchandise to the cashier during checkout, or because the consumer intends to defraud the store, steal the merchandise or collude with the cashier.

Recently, efforts have been undertaken to minimize or reduce bottom-of-the-basket (BoB) losses. Conventional systems, such as those marketed by Kart Saver, Inc. of Sacramento, Calif. and Store-Scan, Inc. of Scottsdale, Ariz. employ infrared sensors designed to detect the presence of merchandise located on the lower shelf of a shopping cart when the shopping cart enters a checkout lane. Disadvantageously, these systems are only able to detect the presence of an object and are not able to provide any indication as to the identity of the object. Consequently, these systems are, disadvantageously, relatively likely to give false positive indications. For example, these systems are unable to distinguish between, for example, merchandise located on the lower shelf of the shopping cart and a customer's leg or shoe. Further disadvantageously, these systems cannot be integrated with the store's existing checkout systems and instead rely on the cashier to recognize the merchandise and input appropriate associated information, such as the price of the merchandise, into the store's checkout system.

Video surveillance is another supplemental device that attempted to minimize or reduce bottom-of-the-basket losses. One example of a video surveillance device was formerly marketed by a company doing business as VerifEye, Inc. of Ontario, Canada. This system employed a video surveillance device mounted in the lane and directed at the bottom of the basket. A small color video display is mounted adjacent the register (or point of service) to aid the cashier in identifying if a BoB item exists. Again, disadvantageously, this system is not integrated with the point of service (POS), forcing reliance on the cashier to scan or key in the item. Consequently, the system productivity issues are ignored and collusions are not addressed. In one of VerifEye's systems, an option to log image, time and location is available. This configuration nonetheless does not recover the lost items.

As compared to mere object detection, object recognition requires image selection which represents the process of selecting a subset of from a sequence of images to be sent to the object recognition processing. The purpose of the image selection is to take the input of, for example, 30 images per second from the camera and select a small number of images so that the computer can process them fully. It is acceptable to queue-up a few images to be processed, but after about 10 seconds the data is no longer of any interest. Thus, there is a problem of balancing between selecting too many images and not selecting enough images.

A selection algorithm to perform the image selection should execute fast and select images with a high probability of seeing each item, for example, each item that is in the bottom of a shopping cart. Because typical object recognition may not always recognize items in the image due to several factors, including lighting and noise, using a single image may not suffice. On the other hand, if too many images get selected, then a point is reached where images must be dropped due to the lack of processing capacity or the fact that the images are no longer timely.

One image selection method proposed in the past is described in pp 84-90 of "An Invitation to 3-D Vision" by Y. Ma, S. Soatto, J. Kosecka, and S. S. Sastry, Springer-Verlag, New York, 2004). Some other conventional methods are summarized below.

The "blind" method simply selects images at the rate they can be processed. When the processing of one image is completed in the object recognition process, the next image captured from the camera is sent to the object recognition process. Under certain lighting conditions, this method works well where the object recognition process can process about 5 images per second. Thus, at every $\frac{1}{5}^{th}$ of a second an image is processed, and with a reasonably slow moving item, enough images containing the item can be captured. However, at a processing rate of 1.5 Hz, which is about what should be expected, this method cannot process images at a rate sufficient to recognize all objects in a fast moving cart.

A method of motion detection by image subtraction uses a simple motion detector to compare each image to the one prior to it by subtracting the value of every pixel from the corresponding pixel in the other image. For very little CPU processing time, the computer can determine if the contents of the image have moved since the prior image (thus termed "motion detection"). When there is no motion in the image, there is no need to run the object recognition engine. When there is motion in the image, a sequence of images should be selected for processing based on the length (in time) of the motion. A simple motion detector is somewhat susceptible to noise and cannot determine the velocity or composition of the object in the image. Without the velocity information, it is impossible to determine the number of images or, more specifically, which images should be processed. In addition, this method cannot tell which direction the motion is in; thus, if someone drops something in front of the camera (vertical motion), the detector would falsely assume the item is passing by. Background motion in general, such as a cashier in the adjacent lane moving around, will also falsely set off the detector.

A method of use of an off-the-shelf motion detector to trigger the camera has the same problem as above of not being able to correctly select an appropriate set of images for the object recognition. The advantage is that the CPU sits completely idle while waiting for images to process, not using much power or generating heat in the meantime.

A method by use of external IR triggers or "trip sensors" provides an accurately-timed image to process, where the center of an item will be in good view. However, velocity information cannot be obtained due to the fact that there is only one measurement in this method. Without knowing the velocity of the item, it is impossible to select an appropriate set of images to process. This method, however, does not use the CPU until it is needed. Using more than one set of IR triggers may provide rudimentary velocity information, but it becomes expensive and prone to human intervention errors.

As can be seen, there is a need for an improved apparatus and method to select which images from a stream of images with which to recognize items, for example, when those items are located on the lower shelf of a shopping cart in the checkout lane of a retail store environment for the automated detection of merchandise.

SUMMARY OF THE INVENTION

The invention in some embodiments features a system and method of optically determining the flow of a region of an image associated with one or more objects. The method in the preferred embodiment includes the steps of: capturing a plurality of images of one or more objects on a moveable structure; partitioning or otherwise subdividing at least one of the images into a plurality of blocks of image data; comparing a set of one or more of the plurality of blocks with at least a portion of different one of the plurality of images; generating a displacement between the block and the other image to which they are compared for each of the blocks in which a match is detected; identifying the displacement measurement common to the most blocks; and associating the displacement measurement common to the most blocks with the moveable structure.

When employed in a retail environment in the preferred embodiment, the moveable structure is a shopping cart, the images are captured by a video camera trained on the cart or the cart's bottom basket, and one or more of the steps of the method are executed by a processor coupled to the checkout terminal for purposes identifying merchandise on the cart. The common displacement measurement can generally isolate the movement of a shopping cart with merchandise in the presence of a stationary background and user motion, thereby enabling the system to selectively extract visual features from the portions of the image associated with the cart and merchandise or other items.

In some embodiments, the relatively-high resolution image from the video camera is down-sampled prior to the partitioning step. Thereafter, one or more of the blocks may be compared to a prior image using correlation techniques. The correlation of a block with the prior image preferably involves comparison of the block's image data with the image data of a portion of the prior image, the portion being referred to as a search field or window. The width of the search field is sized to capture substantially all horizontal motion of the cart while the height of the search field is sized to exclude substantially all human motion. The texture of each block may also be tested after down-sampling to identify blocks having no structure, thereby avoiding executing the comparison step where there is insufficient data to detect a match.

After a block is compared to one or more preceding images, and if a match is detected between the block and a portion of the preceding image(s), the displacement measurement is computed and binned in a histogram. The most common displacement among the blocks, i.e., the most common non-zero and substantially horizontal displacement measurement, is attributed to the cart. Thereafter, feature extraction may be applied to those blocks associated with the cart for purposes of identifying the items being transported by the cart. The features are preferably scale-invariant feature transform (SIFT) features which are identified using a database of known features.

In some embodiments, the invention features a system and method of using optical flow information to select a subset of the plurality of images to be processed and analyzed. The method of selecting images preferably comprises: capturing a plurality of images of one or more objects on a moveable structure; partitioning each of the plurality of images into a plurality of blocks; generating a displacement measurement for one or more of the blocks based on a preceding image, the displacement measurement indicating the amount of motion of the object pictured—or portion of the object pictured—since the preceding image; identifying, for each image, the displacement measurement common to the most blocks of the image; adding the identified displacement measurement of each image to a cumulative displacement measurement representing the amount of movement of the cart over the course of multiple images; and selecting each image for which the cumulative displacement measurement is equal to or exceeds a predetermined value. The selected images may then be transmitted to the feature extractor for image recognition processing, for example.

In the preferred embodiment, the predetermined value corresponds to approximately one third the field of view of the camera used to capture the plurality of images, thereby ensuring that at least two images of every item on the cart is captured and processed while avoiding the need to processes every image. The unselected images may be temporarily buffered, recorded for future processing, or discarded. As discussed above, the initial images captured by the visual sensor may be down-sampled and subjected to texture analysis prior to generating the displacement measurements, although the process of object recognition analysis used to identify the one or more objects generally utilizes the original images from the camera rather than the selected images after being down-sample.

BRIEF DESCRIPTION OF THE DRAWINGS

FIG. 2B is a schematic diagram of another embodiment of the system for merchandise checkout in FIG. 1;

FIG. 9A is a diagrammatic image of single block of FIG. 8B for which a displacement vector is generated, in accordance with a preferred embodiment of the present invention;

FIG. 9B is a diagrammatic image of a search field corresponding to FIG. 8A against which the block of FIG. 9A is compared, in accordance with a preferred embodiment of the present invention;

FIG. 10 is a diagrammatic of a two dimensional grid depicting the motional status of the various blocks associated with an image.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides systems and methods through which one or more visual sensors, such as one or more cameras, operatively coupled to a computer system can view, recognize and identify items for check out. For example, the items may be checked out for purchase in a store, and as a further example, the items may be located on the lower shelf of a shopping cart in the checkout lane of a store environment. The retail store environment can correspond to any environment in which shopping carts or other similar means of carrying items are used. However, it can be appreciated that the present invention can be used in other environments, such as recognizing vehicles, recognizing license plates, or recognizing people. As further examples, the present invention may be used for counting or archiving images (not necessarily recognizing objects) such as taking pictures of people entering or existing a building.

In the present invention, one or more visual sensors can be placed at locations, for example, in a checkout register lane such that when a shopping cart moves into the register lane, a part of the shopping cart, such as the lower shelf, is in the field of view of the visual sensor(s). In contrast to the prior art which merely allows detection, in the present invention, detection and recognition are provided. In an embodiment, visual features or characteristics, such as color and shape, present on one or more objects within the field of view of the visual sensor(s) can be automatically detected as well as recognized, and then associated with one or more instructions, commands, or actions.

In particular, the present system may incorporate a subsystem for selecting a subset of the visual data for the purpose of improving efficiency of the object recognition.

Figure 1:
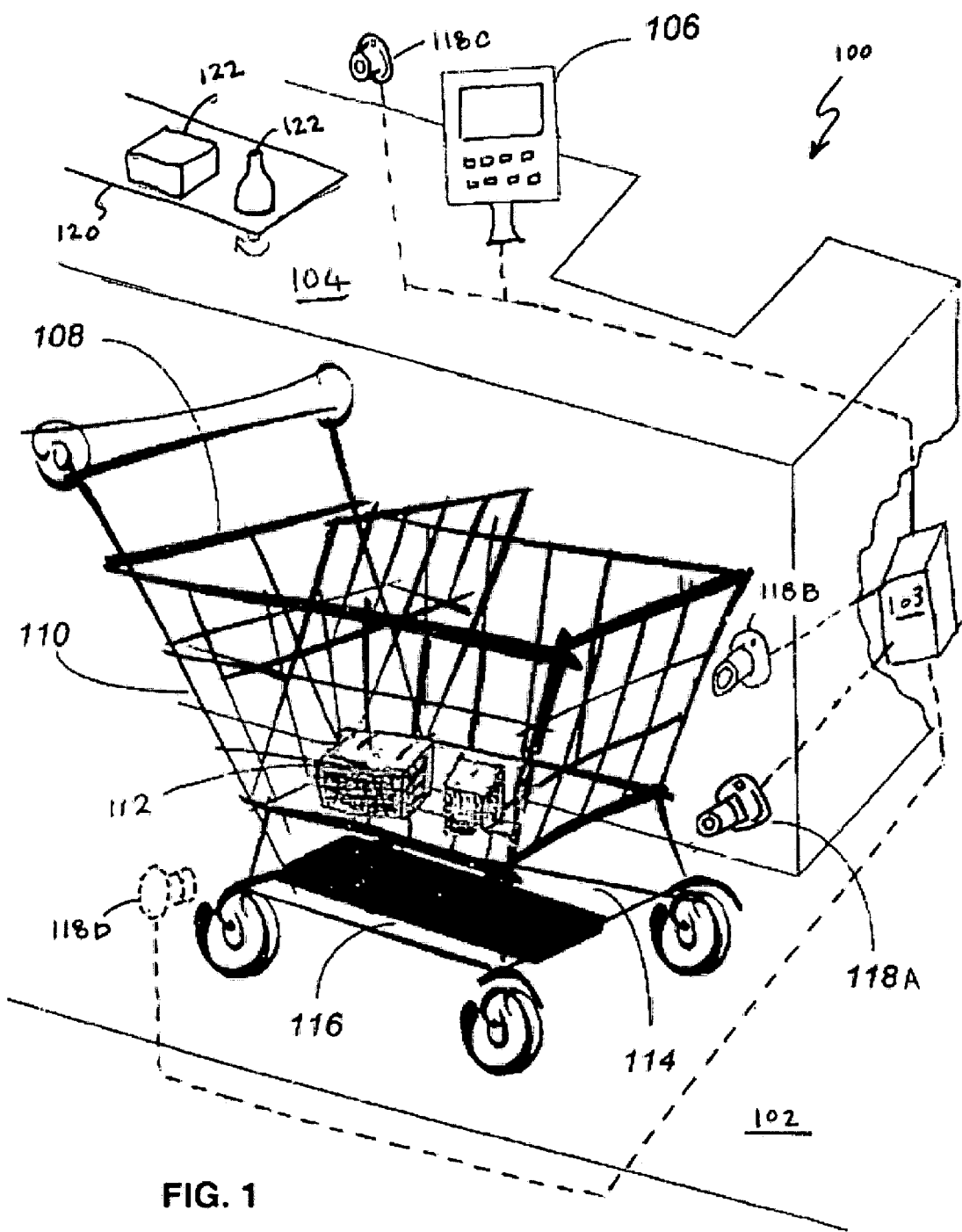
FIG. 1 is a partial cut-away view of a system for merchandise checkout in accordance with one embodiment of the present invention.

FIG. 1 is a partial cut-away view of a system 100 for automatic merchandise checkout in accordance with one embodiment of the present invention. FIG. 1 illustrates an exemplary application of the system 100 that has a capability to recognize and identify objects on a moveable structure. For the purpose of illustration, the system 100 is described as a tool for recognizing items 112, 116 and 122 carried in a basket 110, a lower shelf 114 of a shopping cart 108 and on a belt 120, respectively. However, it should be apparent to those of ordinary skill that the system 100 can also be used to recognize and identify objects in various applications, such as an automatic luggage checking system, based on the same principles as described hereinafter. As a further example, the present invention may also be used to extract and recognize images from a sequence of images such as a streaming video.

As illustrated in FIG. 1, the system 100 includes an aisle 102 and a checkout counter 104. The system 100 also includes visual sensors 118A-C, a checkout subsystem 106, and a processing unit 103 that may include a computer system and/or databases. In one embodiment, the system 100 may include an additional visual sensor 118D that may be affixed to a neighboring checkout counter wall facing the shopping cart 108. In another embodiment, the system 100 may include two additional visual sensors, one located above the shopping cart 108 and another on the floor of the aisle 102, respectively. Details of the system 100 will be given in following sections in connection with FIGS. 2A-3. For simplicity, only four of the six visual sensors and one checkout subsystem 106 are shown in FIG. 1. However, it should be apparent to those of ordinary skill that any number of visual sensors and checkout subsystems may be used without deviating from the sprit and scope of the present invention.

The visual sensors 118A-C, checkout subsystem 106, and processing unit 103 may be fully integrated with the store's existing conventional checkout subsystem, such as a universal product code (UPC) system, on a plug-and-play configuration or a non-interfering parallel processing basis. Recognition alerts and displays for the items recognized by the system 100 can not only notify the cashiers of the potential existence of an item, which cashiers must respond to complete a transaction but provide a non-interrupt continuous customer checkout flow at the POS.

The checkout subsystem 106, such as a cash register, may rest on the checkout counter 104 and include one or more input devices. Exemplary input devices may include a barcode scanner, a scale, a keyboard, keypad, touch screen, card reader, and the like. In one embodiment, the checkout subsystem 106 may correspond to a checkout terminal used by a checker or cashier. In another embodiment, the checkout subsystem 106 may correspond to a self-service checkout terminal.

Each of the visual sensors 118A-D may be a digital camera with a CCD imager, a CMOS imager, an infrared imager, and the like. The visual sensors 118A-D may include normal lenses or special lenses, such as wide-angle lenses, fish-eye lenses, omni-directional lenses, and the like. Further, the lens may include reflective surfaces, such as planar, parabolic, or conical mirrors, which may be used to provide a relatively large field of view or multiple viewpoints.

During checkout, a shopping cart 108 may occupy the aisle 102. The shopping cart 108 may include the basket 110 and lower shelf 114. In one embodiment, as will be described in greater detail later in connection with FIG. 4, the visual sensors 118A-D may be used to recognize the presence and identity of the items 112 and 116, which may complement or replace a conventional UPC scanning system as well as manual checkout operation. In another embodiment, the customer or cashier may place the items 122 on the belt to expedite the checkout process.

Figure 2A:
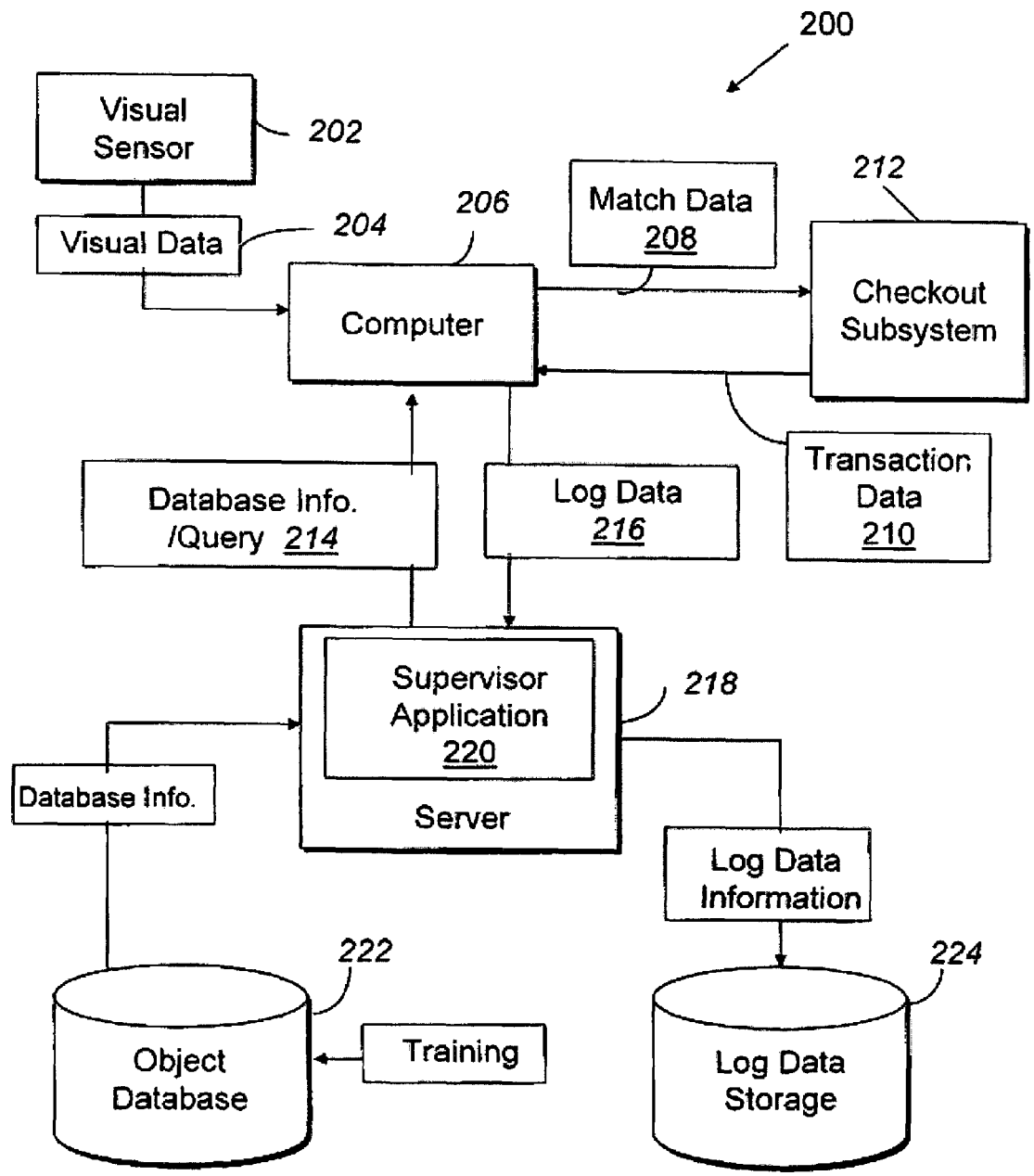
FIG. 2A is a schematic diagram of one embodiment of the system for merchandise checkout in FIG. 1.

FIG. 2A is a schematic diagram of one embodiment 200 of the system for merchandise checkout in FIG. 1. It will be understood that the system 200 may be implemented in a variety of ways, such as by dedicated hardware, by software executed by a microprocessor, by firmware and/or computer readable medium executed by a microprocessor or by a combination of both dedicated hardware and software. Also, for simplicity, only one visual sensor 202 and one checkout subsystem 206 are shown in FIG. 2A. However, it should be apparent to those of ordinary skill that any number of visual sensors and checkout subsystems may be used without deviating from the sprit and scope of the present invention.

The visual sensor 202 may continuously capture images at a predetermined rate and compare two or more selected images to detect motion of an object that is at least partially within the field of view of the visual sensor 202. Thus, when a customer carries one or more items 116 on, for example, the lower shelf 114 of the shopping cart 108 and moves into the checkout lane 100, the visual sensor 202 may recognize the presence of the items 116 and send visual data 204 to the computer 206 that may process the visual data 204. In one embodiment, the visual data 204 may include the visual images of the one or more items 116. In another embodiment, an IR detector may be used to detect motion of an object.

It will be understood that the visual sensor 202 may communicate with the computer 206 via an appropriate interface, such as a direct connection or a networked connection. This interface may be hard wired or wireless. Examples of interface standards that may be used include, but are not limited to, Ethernet, IEEE 802.11, Bluetooth, Universal Serial Bus, FireWire, S-Video, NTSC composite, frame grabber, and the like.

The computer 206 may analyze the visual data 204 provided by the visual sensor 202 and identify visual features of the visual data 204. In one example, the features may be identified using an object recognition process that can identify visual features of an image. In another embodiment, the visual features may correspond to scale-invariant features. The concept of scale-invariant feature transformation (SIFT) has been extensively described in U.S. Pat. No. 6,711,293 issued Mar. 23, 2004, which is hereby incorporated by reference herein, and by David G. Lowe, "Object Recognition from Local Scale-Invariant Features," Proceedings of the International Conference on Computer Vision, Corfu, Greece, September, 1999 and by David G. Lowe, "Local Feature View Clustering for 3D Object Recognition," Proceedings of the IEEE Conference on Computer Vision and Pattern Recognition, Kauai, Hi., December, 2001; both of which are incorporated herein by reference.

The computer 206 may be a personal computer (PC), a server computer, or the like, and may be equipped with a network communication device such as a network interface card, a modem, infra-red (IR) port, or other network connection device suitable for connecting to a network. The computer 206 may be connected to a network such as a local area network or a wide area network, such that information, including information about merchandise sold by the store, may be accessed from the computer 206. The information may be stored on a central computer system, such as a network fileserver, a mainframe, a secure Internet site, and the like. Furthermore, the computer 206 may execute an appropriate operating system. As is conventional, the appropriate operating system may advantageously include a communications protocol implementation that handles incoming and outgoing message traffic passed over the network.

The computer 206 may be connected to a server 218 that may provide the database information 214 stored in an Object Database 222 and/or a Log Data Storage 224. The server 218 may send a query to the computer 206. A query is an interrogating process initiated by the Supervisor Application 220 residing in the server 218 to acquire Log Data from the computer 206 regarding the status of the computer 206, transactional information, cashier identification, time stamp of a transaction and the like. The computer 206, after receiving a query 214 from the server 218, may retrieve information from the log data 216 to pass on relevant information back to the server 218, thereby answering the interrogation. A Supervisor Application 220 in the server 218 may control the flow of information therethrough and manage the Object Database 222 and Log Data Storage 224. When the system 200 operates in a "training" mode, the server 218 may store all or at least part of the analyzed visual data, such as features descriptors and coordinates associated with the identified features, along with other relevant information in the Object Database 222. The Object Database 222 will be discussed in greater detail later in connection with FIG. 3.

It will be understood that during system training, it may be convenient to use a visual sensor that is not connected to a checkout subsystem and positioned near the floor. For example, training images may be captured in a photography studio or on a "workbench," which can result in higher-quality training images and less physical strain on a human system trainer. Further, it will be understood that during system training, the computer 206 may not need to output match data 208. In one embodiment, the features of the training images may be captured and stored in the Object Database 222.

When the system 200 operates in an "operation" mode, the computer 206 may compare the visual features with the database information 214 that may include a plurality of known objects stored in the Object Database 222. If the computer 206 finds a match in the database information 214, it may return match data 208 to the checkout subsystem 206. Examples of appropriate match data will be discussed in greater detail later in connection with FIG. 3. The server 218 may provide the computer 206 with an updated, or synchronized copy of the Object Database 222 at regular intervals, such as once per hour or once per day, or when an update is requested by the computer 206 or triggered by a human user.

When the computer 206 cannot find a match, it may send a signal to the checkout subsystem 212 that may subsequently display a query on a monitor and request the operator of the checkout subsystem 212 to take an appropriate action, such as identifying the item 116 associated with the query and providing the information of the item 116 using an input device connected to the checkout subsystem 212.

In the operational mode, the checkout subsystem 212 may provide transaction data 210 to the computer 206. Subsequently, the computer 206 may send log data 216 to the server 218 that may store the data in the Object Database 222, wherein the log data 216 may include data for one or more transactions. In one embodiment, the computer 206 may store the transaction data 210 locally and provide the server 218 with the stored transaction data for storage in the Object Database 222 at regular intervals, such as once per hour or once per day.

The server 218, Object Database 222 and Log Data Storage 224 may be connected to a network such as a local area network or a wide area network, such that information, including information from the Object Database 222 and the Log Data Storage 224, can be accessed remotely. Furthermore, the server 208 may execute an appropriate operating system. As is conventional, the appropriate operating system may advantageously include a communications protocol implementation that handles incoming and outgoing message traffic passed over the network.

When the checkout subsystem 212 receives the match data 208 from the computer 206, the checkout subsystem 212 may take one or more of a wide variety of actions. In one embodiment, the checkout subsystem 212 may provide a visual and/or audible indication that a match has been found for the operator of the checkout subsystem 212. In one example, the indication may include the name of the object. In another embodiment, the checkout subsystem 212 may automatically add the item or object associated with the identified match to a list or table of items for purchase without any action required from the operator of the checkout subsystem 212. It will be understood that the list or table may be maintained in the checkout system 212 memory. In one embodiment, when the entry of merchandise or items or purchase is complete, a receipt of the items and their corresponding prices may be generated at least partly from the list or table. The checkout system 212 may also store an electronic log of the item, with a designation that it was sent by the computer 206.

FIG. 2B is a schematic diagram of another embodiment 230 of the system for merchandise checkout in FIG. 1. It will be understood that the system 230 may be similar to the system 200 in FIG. 2A with some differences. Firstly, the system 230 may optionally include a feature extractor 238 for analyzing visual data 236 sent by a visual sensor 234 to extract features. The feature extractor 238 may be dedicated hardware. The feature extractor 238 may also send visual display data 240 to a checkout subsystem 242 that may include a display monitor for displaying the visual display data 240. Secondly, in the system 200, the computer 206 may analyze the visual data 204 to extract features, recognize the items associated with the visual data 204 using the extracted features and send the match data 208 to the checkout subsystem 212. In contrast, in the system 230, the feature extractor 238 may analyze the visual data 236 to extract features and send the analyzed visual data 244 to the server 246 that may subsequently recognize the items. As a consequence, the server 246 may send the match data 248 to the checkout subsystem 242. Thirdly, in the system 200, the checkout subsystem 212 may send transaction log data to the server 218 via the computer 206, while, in the system 230, the checkout subsystem 242 may send the transaction log data 250 to the server 246 directly. It is noted that both systems 200 and 230 may use the same object recognition technique, such as the scale-invariant feature transform (SIFT) method, even though different components may perform the process of analysis and recognition. Fourthly, the server 246 may include a recognition application 245.

It is noted that the system 230 may operate without the visual display data 240. In an alternative embodiment of the system 230, the visual display data 240 may be included in the match data 248.

It will be understood that the components of the system 230 may communicate with one another via connection mechanisms similar to those of the system 200. For example, the visual sensor 234 may communicate with the server 246 via an appropriate interface, such as a direct connection or a networked connection, wherein examples of interface standards may include, but are not limited to, Ethernet, IEEE 802.11, Bluetooth, Universal Serial Bus, FireWire, S-Video, NTSC composite, frame grabber, and the like. Likewise, the Object Database 252 and the Log Data Storage 254 may be similar to their counterparts of FIG. 2A.

The server 246 may execute an appropriate operating system. The appropriate operating system may include but is not limited to operating systems such as Linux, Unix, Microsoft® Windows® 3.1, Microsoft® Windows® 95, Microsoft® Windows® 98, Microsoft® Windows® NT, Microsoft® Windows® 2000, Microsoft® Windows® Me, Microsoft® Windows® XP, Apple® MacOS®, or IBM OS/2®. As is conventional, the appropriate operating system may advantageously include a communications protocol implementation that handles incoming and outgoing message traffic passed over the network.

The system 230 may operate in an operation mode and a training mode. In the operation mode, when the checkout subsystem 242 receives match data 248 from the server 246, the checkout subsystem 242 may take actions similar to those performed by the checkout subsystem 212. In the operational mode, the checkout subsystem 242 may provide transaction log data 250 to the server 246. Subsequently, the server 246 may store the data in the Object Database 252. In one embodiment, the checkout subsystem 242 may store the match data 248 locally and provide the server 246 with the match data for storage in the Object Database 252 at regular intervals, such as once per hour or once per day.

Figure 2C:
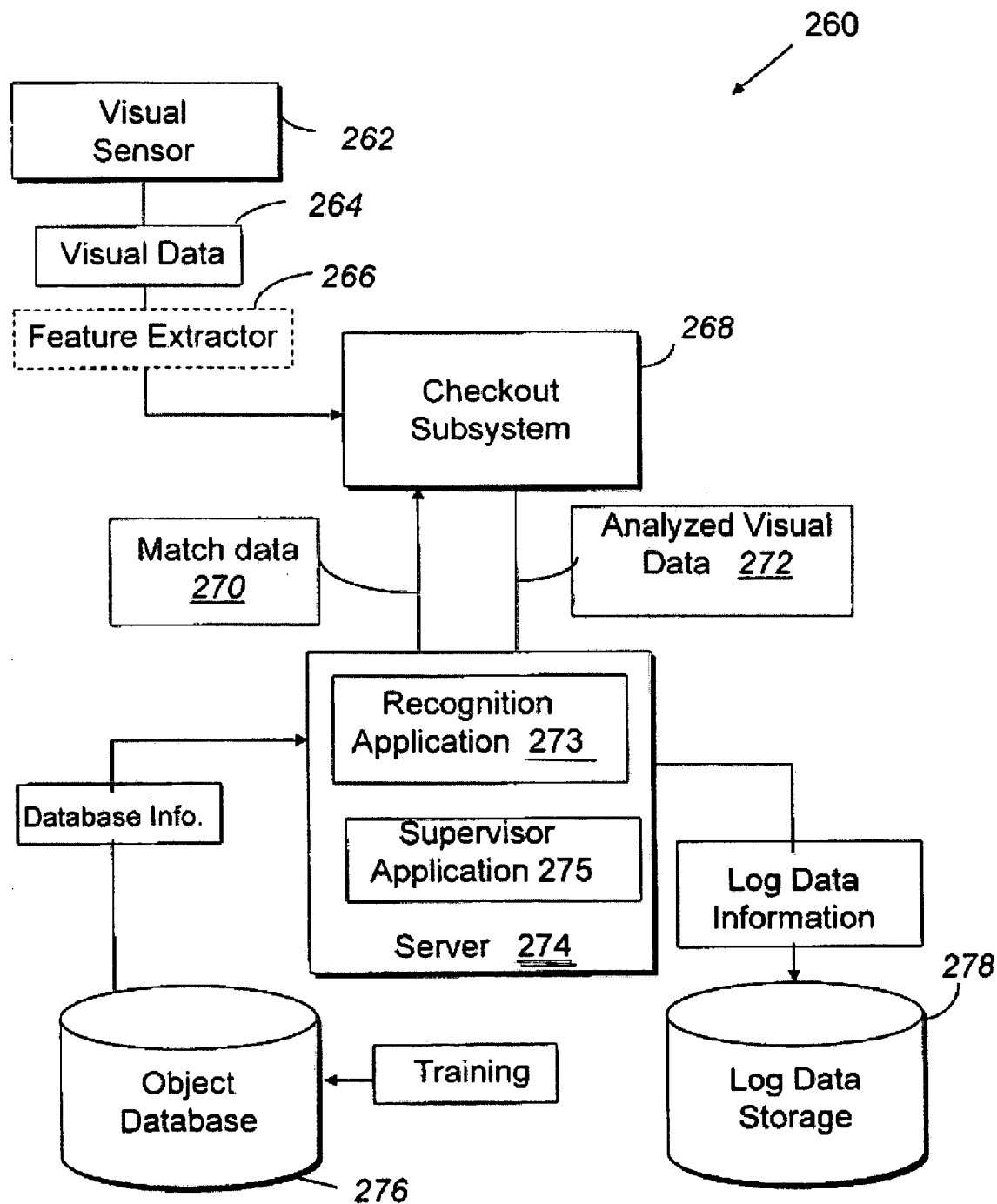
FIG. 2C is a schematic diagram of yet another embodiment of the system for merchandise checkout in FIG. 1.

FIG. 2C is a schematic diagram of another embodiment 260 of the system for merchandise checkout in FIG. 1. The system 260 may be similar to the system 230 in FIG. 2B with a difference that the functionality of the feature extractor 238 may be implemented in a checkout subsystem 268. As illustrated in FIG. 2C, a visual sensor 262 may send visual data 264 to a checkout subsystem 268 that may analyze the data to generate analyzed visual data 272. In an alternative embodiment, the visual data 264 may be provided as an input to a server 274 via the checkout subsystem 268 if the server 274 has the capability to analyze the input and recognize the item associated with the input. In this alternative embodiment, the server 274 may receive the unmodified visual data 264 via the checkout subsystem 268, and perform the analysis and feature extraction of the unmodified visual data 264.

Optionally, a feature extractor 266 may be used to extract features and generate analyzed visual data. The visual extractor 266 may be implemented within a visual sensor unit as shown in FIG. 2B or may be separate from the visual sensor. In this case, the checkout subsystem 268 may simply pass the analyzed visual data 272 to the server 274.

The system 260 may operate in an operation mode and a training mode. In the operation mode, the checkout subsystem 268 may store a local copy of the Object Database 276, which advantageously may allow the matching process to occur relatively quickly. In the training mode, the server 274 may provide the checkout subsystem 268 with an updated, or synchronized copy of the Object Database 276 at regular intervals, such as once per hour or once per day, or when an update is requested by the checkout subsystem 268.

When the system 260 operates in the operation mode, the server 274 may send the match data 270 to the checkout subsystem 268. Subsequently, the checkout subsystem 268 may take actions similar to those performed by the checkout subsystem 242. The server 274 may also provide the match data to a Log Data Storage 278. It will be understood that the match data provided to the Log Data Storage 278 can be the same as or can differ from the match data 270 provided to the checkout subsystem 268. In one embodiment, the match data provided to the Log Data Storage 278 may include an associated timestamp, but the match data 270 provided to the checkout subsystem 268 may not include a timestamp. The Log Data Storage 278, as well as examples of appropriate match data provided for the Log Data Storage 278, will be discussed in greater detail later in connection with FIG. 3. In an alternative embodiment, the checkout subsystem 268 may store match data locally and provide the server 274 with the match data for storage in the Log Data Storage 278 at regular intervals, such as once per hour or once per day.

It will be understood that the components of the system 260 may communicate with one another via connection mechanisms similar to those of the system 230. Also, it is noted that the Object Database 276 and Log Data Storage 278 may be similar to their counterparts of FIG. 2B and explained in the following sections in connection with FIG. 3.

Optionally, the server 274 can reside inside the checkout subsystem 268 using the same processing and memory power in the checkout subsystem 268 to run both the supervisor application 275 and recognition application 273.

Figure 3:
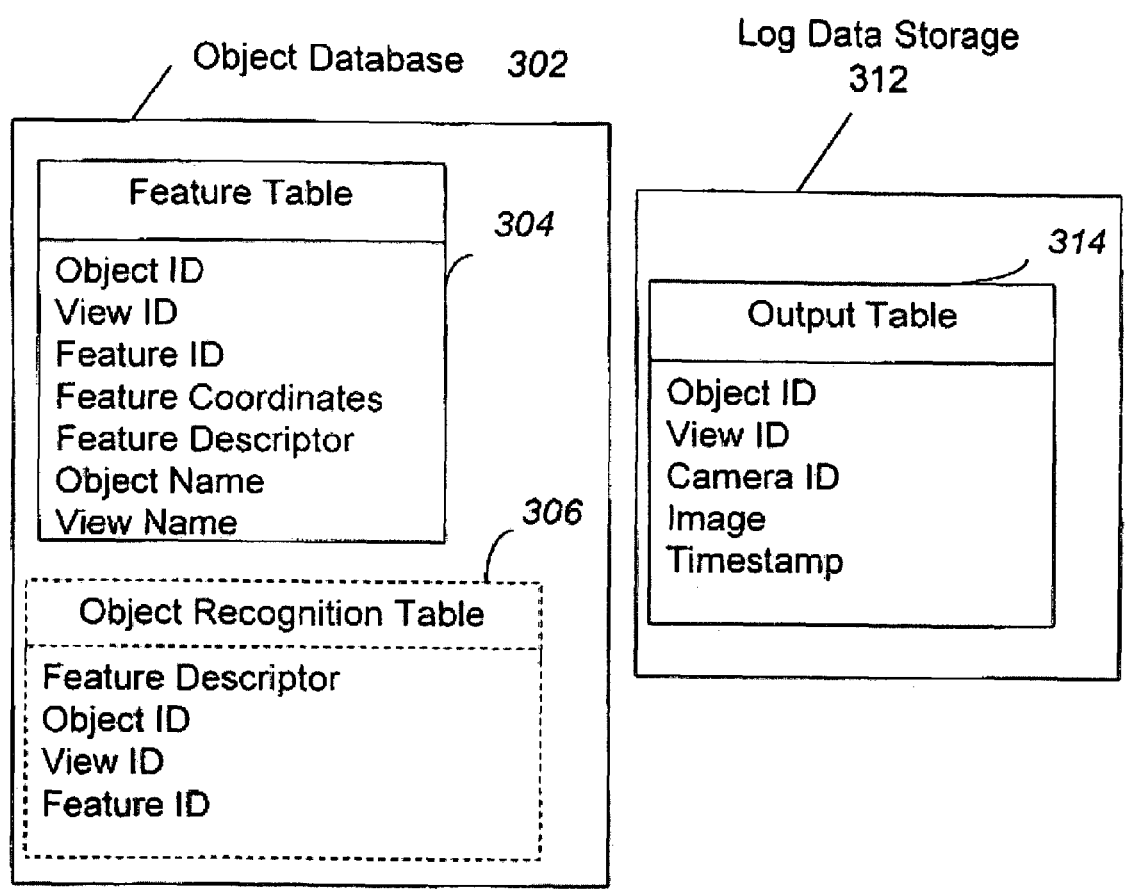
FIG. 3 is a schematic diagram of an object database and operation database illustrating an example of a relational database structure in accordance with one embodiment of the present invention.

FIG. 3 is a schematic diagram of an Object Database 302 and Log Data Storage 312 (or, equivalently, log data storage database) illustrating an example of a relational database structure in accordance with one embodiment of the present invention. It will be understood by one of ordinary skill in the art that a database may be implemented on an addressable storage medium and may be implemented using a variety of different types of addressable storage mediums. For example, the Object Database 302 and/or the Log Data Storage 312 may be entirely contained in a single device or may be spread over several devices, computers, or servers in a network. The Object Database 302 and/or the Log Data Storage 312 may be implemented in such devices as memory chips, hard drives, optical drives, and the like. Though the databases 302 and 312 have the form of a relational database, one of ordinary skill in the art will recognize that each of the databases may also be, by way of example, an object-oriented database, a hierarchical database, a lightweight directory access protocol (LDAP) directory, an object-oriented-relational database, and the like. The databases may conform to any database standard, or may even conform to a non-standard private specification. The databases 302 and 312 may also be implemented utilizing any number of commercially available database products, such as, by way of example, Oracle® from Oracle Corporation, SQL Server and Access from Microsoft Corporation, Sybase® from Sybase, Incorporated, and the like.

The databases 302 and 312 may utilize a relational database management system (RDBMS). In a RDBMS, the data may be stored in the form of tables. Conceptually, data within the table may be stored within fields, which may be arranged into columns and rows. Each field may contain one item of information. Each column within a table may be identified by its column name one type of information, such as a value for a SIFT feature descriptor. For clarity, column names may be illustrated in the tables of FIG. 3.

A record, also known as a tuple, may contain a collection of fields constituting a complete set of information. In one embodiment, the ordering of rows may not matter, as the desired row may be identified by examination of the contents of the fields in at least one of the columns or by a combination of fields. Typically, a field with a unique identifier, such as an integer, may be used to identify a related collection of fields conveniently.

As illustrated in FIG. 3, by way of example, two tables 304 and 306 may be included in the Object Database 302, and one table 314 may be included in the Log Data Storage 312. The exemplary data structures represented by the five tables in FIG. 3 illustrate a convenient way to maintain data such that an embodiment using the data structures can efficiently store and retrieve the data therein. The tables for the Object Database 302 may include a Feature Table 304, and an optional Object Recognition Table 306.

The Feature Table 304 may store data relating to the identification of an object and a view. For example, a view can be characterized by a plurality of features. The Feature Table 304 may include fields for an Object ID, a View ID, a Feature ID for each feature stored, a Feature Coordinates for each feature stored, and a Feature Descriptor associated with each feature stored, view name field, an object name field. The Object ID field and the View ID field may be used to identify the records that correspond to a particular view of a particular object. A view of an object may be typically characterized by a plurality of features. Accordingly, the Feature ID field may be used to identify records that correspond to a particular feature of a view. The View ID field for a record may be used to identify the particular view corresponding to the feature and may be used to identify related records for other features of the view. The Object ID field for a record may used to identify the particular object corresponding to the feature and may be used to identify related records for other views of the object and/or other features associated with the object. The Feature Descriptor field may be used to store visual information about the feature such that the feature may be readily identified when the visual sensor observes the view or object again. The Feature Coordinate field may be used to store the coordinates of the feature. This may provide a reference for calculations that depend at least in part on the spatial relationships between multiple features. An Object Name field may be used to store the name of the object and may be used to store the price of the object. The Feature Table 308 may, optionally, store additional information associated with the object. The View Name field may be used to store the name of the view. For example, it may be convenient to construct a view name by appending a spatial designation to the corresponding object name. As an illustration, if an object name is "Cola 24-Pack," and the object is packaged in the shape of a box, it may be convenient to name the associated views "Cola 24-Pack Top View," "Cola 24-Pack Bottom View," "Cola 24-Pack Front View," "Cola 24-Pack Back View," "Cola 24-Pack Left View," and "Cola 24-Pack Right View."

The optional Object Recognition Table 306 may include the Feature Descriptor field, the Object ID field (such as a Universal Product Code), the View ID field, and the Feature ID field. The optional Object Recognition Table 306 may advantageously be indexed by the Feature Descriptor, which may facilitate the matching of observed images to views and/or objects.

The illustrated Log Data Storage 312 includes an Output Table 314. The Output Table 314 may include fields for an Object ID, a View ID, a Camera ID, a Timestamp, and an Image. The system may append records to the Output Table 314 as it recognizes objects during operation. This may advantageously provide a system administrator with the ability to track, log, and report the objects recognized by the system. In one embodiment, when the Output Table 314 receives inputs from multiple visual sensors, the Camera ID field for a record may be used to identify the particular visual sensor associated with the record. The Image field for a record may be used to store the image associated with the record.

Figure 4:
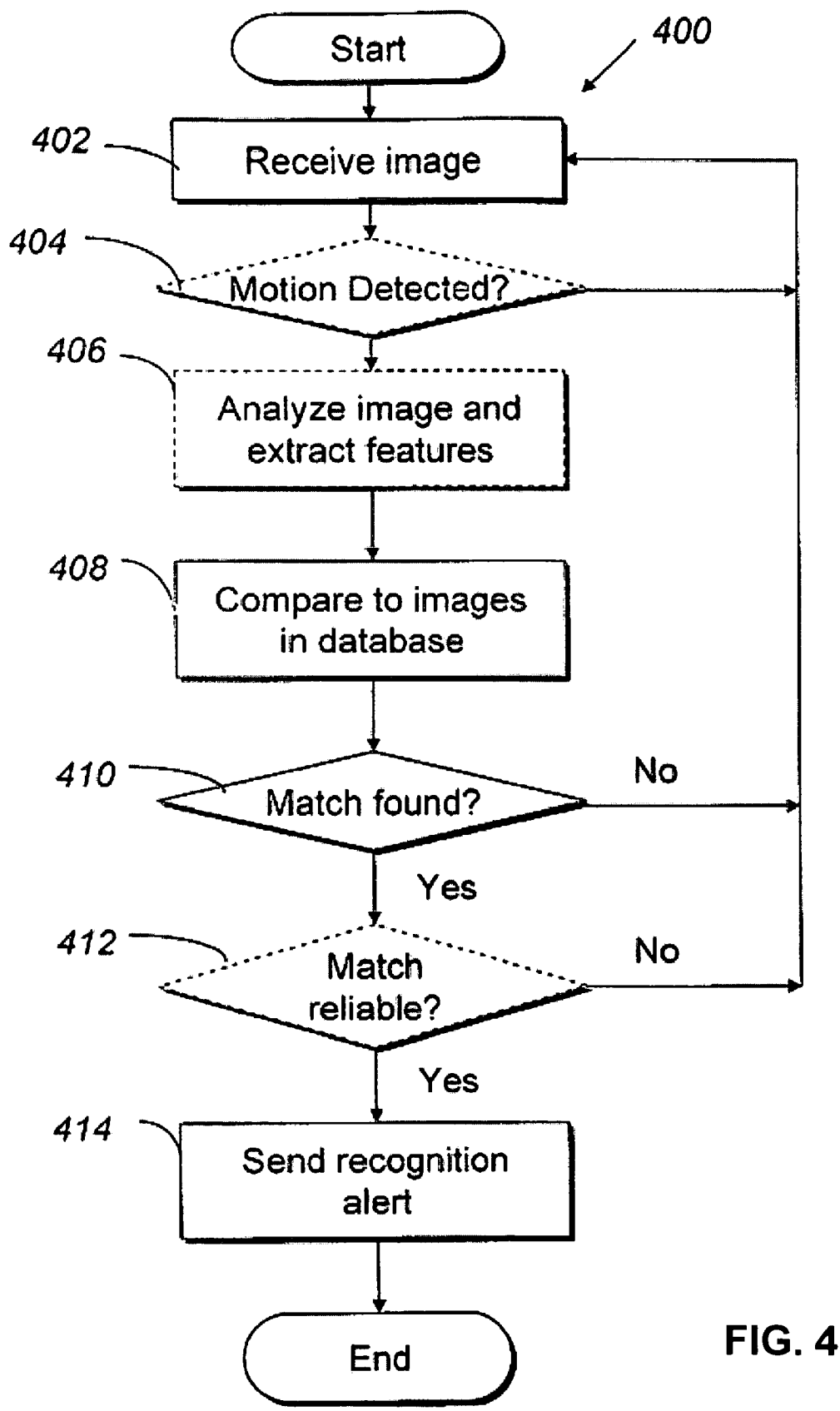
FIG. 4 is a flowchart that illustrates a process for recognizing and identifying objects in accordance with one embodiment of the present invention.

FIG. 4 is a flowchart 400 that illustrates a process for recognizing and identifying objects in accordance with one embodiment of the present invention. It will be appreciated by those of the ordinary skill that the illustrated process may be modified in a variety of ways without departing from the spirit and scope of the present invention. For example, in another embodiment, various portions of the illustrated process may be combined, be rearranged in an alternate sequence, be removed, and the like. In addition, it should be noted that the process may be performed in a variety of ways, such as by software executing in a general-purpose computer, by firmware and/or computer readable medium executed by a microprocessor, by dedicated hardware, and the like.

At the start of the process illustrated in FIG. 4, the system 100 has already been trained or programmed to recognize selected objects.

The process may begin in a state 402. In the state 402, a visual sensor, such as a camera, may capture an image of an object to make visual data. In one embodiment, the visual sensor may continuously capture images at a predetermined rate. The process may advance from the state 402 to a state 404.

In one of the exemplary embodiments, a state 404 can be added to the process. In the state 404, two or more consecutive images may be compared to determine if motion of an item is detected. If the method of selecting a subset of images of interest is employed (described in more detail below in context of FIG. 7), state 404 may entail the detection of the accumulated motion of the cart and the selection of a limited number of images with which object recognition processing is performed. If motion is detected, the process may proceed to step 406. Otherwise, the visual sensor may capture more images. State 404 is useful when the image capture speed of the visual device and the object recognition process are limited to certain numbers of frames per second. When the image capture speed of the visual device and the object recognition process are sufficiently fast, the process may proceed directly to step 406.

In the state 406, the process may analyze the visual data acquired in the state 404 to extract visual features. As mentioned above, the process of analyzing the visual data may be performed by a computer 206, a feature extractor 238, a checkout system 268, or a server 274 (shown in FIGS. 2A-C). A variety of visual recognition techniques may be used, and it will be understood by one of ordinary skill in the art that an appropriate visual recognition technique may depend on a variety of factors, such as the visual sensor used and/or the visual features used. In one embodiment, the visual features may be identified using an object recognition process that can identify visual features. In one example, the visual features may correspond to SIFT features. Next, the process may advance from the state 406 to a state 408.

In the state 408, the identified visual features may be compared to visual features stored in a database, such as an Object Database 222. In one embodiment, the comparison may be done using the SIFT method described earlier. The process may find one match, may find multiple matches, or may find no matches. In one embodiment, if the process finds multiple matches, it may, based on one or more measures of the quality of the matches, designate one match, such as the match with the highest value of an associated quality measure, as the best match. Optionally, a match confidence may be associated with a match, wherein the confidence is a variable that is set by adjusting a parameter with a range, such as 0% to 100%, that relates to the fraction of the features that are recognized as matching between the visual data and a particular stored image, or stored set of features. If the match confidence does not exceed a pre-determined threshold, such as a 90% confidence level, the match may not be used. In one embodiment, if the process finds multiple matches with match confidence that exceed the pre-determined threshold, the process may return all such matches. The process may advance from the state 408 to a decision block 410.

In the decision block 410, a determination may be made as to whether the process found a match in the state 408. If the process does not identify a match in the state 408, the process may return to the state 402 to acquire another image. If the process identifies a match in the state 408, the process may proceed to an optional decision block 412.

In the optional decision block 412, a determination may be made as to whether the match found in the state 408 is considered reliable. In one embodiment, when a match is found, the system 100 may optionally wait for one or more extra cycles to compare the matched object from these extra cycles, so that the system 100 can more reliably determine the true object. In one implementation, the system 100 may verify that the matched object is identically recognized for two or more cycles before determining a reliable match. Another implementation may compute the statistical probability that each object that can be recognized is present over several cycles. In another embodiment, a match may be considered reliable if the value of the associated quality measure or associated confidence exceeds a predetermined threshold. In another embodiment, a match may be considered reliable if the number of identified features exceeds a predetermined threshold. In yet another embodiment, the optional decision block 412 may not be used, and the match may always be considered reliable.

If the optional decision block 412 determines that the match is not considered reliable, the process may return to the state 402 to acquire another image. If the process determines that the match is considered reliable, the process may proceed to a state 414.

In the state 414, the process may send a recognition alert, where the recognition alert may is followed by one or more actions. Exemplary action may be displaying item information on a display monitor of a checkout subsystem, adding the item in a shopping list, sending match data to a checkout subsystem, storing match data into an operation database, or the actions described in connection with FIGS. 1 and 2. Subsequently, the process may proceed to a decision block 416.

In the decision block 416, a determination may be made as to whether there are additional items to be checked out. If answer to the step 416 is YES, the process may return to step 402. Otherwise, the process stops.

As described above, object recognition refers to the process of comparing images in a database to images provided by a camera, and searching for matches. The object recognition process generally requires a significant amount of CPU power. Even a good computer is capable of processing, for example, only about 1.5 images per second, equivalent to 3 images out of every 60 image input from a camera with a standard setting of 30 images per second.

Figure 6:
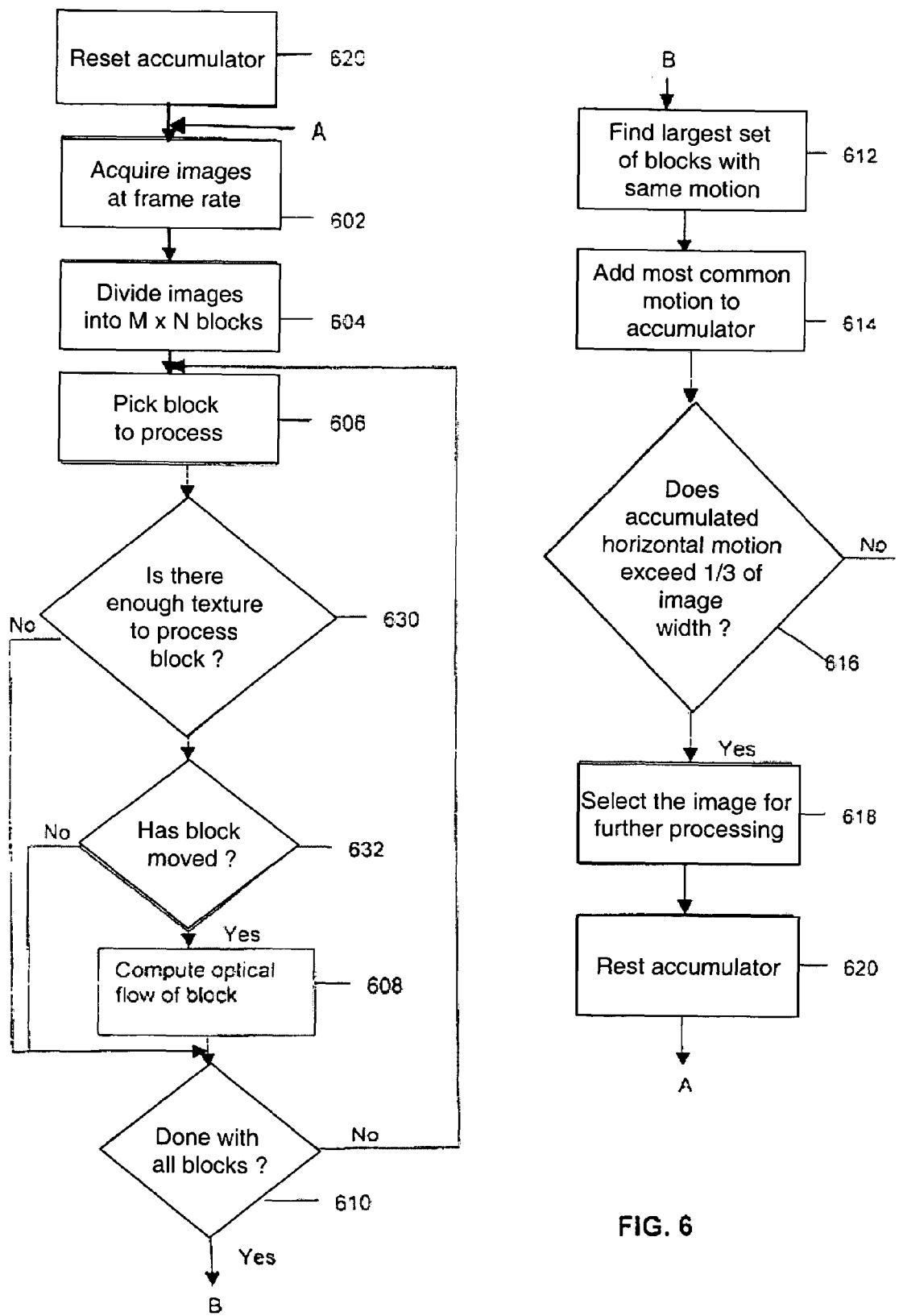
FIG. 6 is a flowchart schematically representing a process in which an image is searched for a block corresponding to the block in the prior image.

Using an Optical Flow Algorithm and a discriminator specific to the task at hand, a fast and accurate image selection algorithm is provided by the present invention, as depicted in FIG. 6

Figure 5:
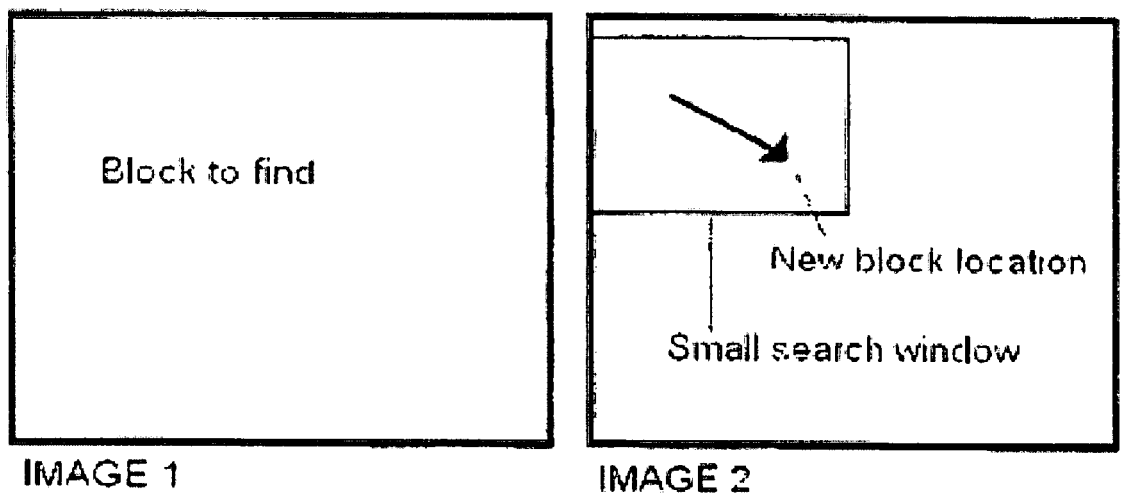
FIG. 5 schematically depicts a step of searching a small window of one image for blocks from another image.

First, in step 602, images are acquired as the camera inputs them. Each image data is divided into M×N data blocks in step 604, each block representing a unique subfield of the image data. Thereafter, as shown in FIG. 5, the Optical Flow Algorithm can search a small window of one image for blocks from another image for purposes of detecting relative motion of objects visible in the images. The block in the left image in this example is "scanned" across the small search window in the right image searching for the corresponding block that "matches," i.e., that maximizes the normalized correlation, minimizes the sum of absolute differences, or optimizes some other measure of the similarity of two blocks. This method may be applied to all blocks in the left image through steps 606 and 610. (The process steps 630 and 632 will be described in detail later.)

These images can be consecutively captured from a camera and thus the difference between them represents the amount of motion. Motion may occur in any direction, and all of the blocks need not move in the same direction. Some blocks may not move at all, e.g. the background. The Optical Flow Algorithm may thus return a two dimensional matrix of displacement vectors in step 608, each vector representing the motion of the object or—portion of an object—visible the associated block. The motion of the blocks, i.e., the objects in the image, may be measured in terms of distance, velocity, or the number of pixels the block has moved. The results of the motion may then be interpreted.

Taking the output from the Optical Flow Algorithm as input into a Selection Algorithm, the task then becomes to isolate the motion of the cart and select a set of images that contain each item in the cart at least twice. First, any motion that is not strictly horizontal can be ignored. In fact, a primary interest is the uniform horizontal motion, since the cart plus items therein should be moving together at the same velocity. This aspect can be useful in isolating the cart and reducing the probability that people walking by will set off the detector as their motion is not uniformly horizontal. Since the number of images that the object recognition can process may be small (e.g., 3 images out of every 60), ignoring any motion that can be ignored leaves more processing time for high-probability images, i.e., those images having a relatively high probability of representing the images to be recognized.

Additionally, since a primary interest is in the parts of the image that contain objects in motion, blanking out or zero'ing out parts of the image with no motion suppresses object recognition processing in those parts which can speed up the object recognition by as much as 40%, for example, thus allowing more frames to be processed.

Ultimately, each block of each image may be reduced to one vector or one number representing how far the object in motion has moved, in pixels, horizontally, since the prior image. The largest set of blocks that exhibit the same motion can be considered to be representative of the uniform object motion (step 612). Having this information available, a correct subset of the sequence of images can be saved and processed such that every item seen by the camera is captured for object recognition processing at least twice. The algorithm may comprise a step of processing an image every time the cumulative number of pixels moved is equal to or exceeds, for example, ⅓ the number of pixels in the image (step 614) in the direction of motion of the cart. In this case, a picture can be selected and an item may, for example, be located one third of the way across the image, and the next picture can be selected when the item is located, for example, two thirds of the way across the image.

These images may be selected and sent to the object recognition queue in step 618, and the cumulative motion counter (accumulator) may be reset to zero as in step 620.

An optional step may include the process of deducting observed motion from the cumulative motion where the observed motion is in the direction opposite that of conventional cart movement. Since the image selection process may only be concerned with selecting images where there is motion in the direction a shopper would be moving during checkout, motion in the opposite direction may be discarded to prevent it from factoring into the cumulative motion measurement. Subtracting the motion in the wrong direction may prevent the Selection Algorithm from selecting images when there is a large amount of back and forth motion in front of the camera. For example, motion of a cashier in an adjacent check out lane swaying left and right may be subtracted so as to prevent the Selection Algorithm from selecting these images for recognition.

The Selection Algorithm may be robust with respect to the total amount of motion in the image (both spatially and temporally). For example, a small box may occupy a small part of the image, whereas a large box may cover a large part of the image. The selection algorithm may desirably, for each pass of an object, select the same number of images to be sent to the object recognition. Using the uniform velocity information provided by the Optical Flow Algorithm, that level of robustness can be achievable. The present Selection Algorithm may also handle the difference between a cart passing by close to the camera versus passing by farther away. Items can be tracked in terms of pixel velocity, and therefore each item can be inspected by the feature extractor at least twice regardless of the distance from the camera.

It can be seen that the Selection Algorithm may work independently of the image processing rate, resolution, and lens properties of the camera. For example, an item may still have to move one third of the way across the image, regardless of how zoomed-in the camera is or how fast the images are being taken. It may be possible to drop an intermediate frame from the camera while the cart is moving without significant loss in accuracy of the object recognition process.

In an embodiment, the optical flow code may be running at 30 Hz and require about 25% of the CPU on a typical 2.8 GHz Pentium® computer. It may be desired that the Selection Algorithm use no more than 10-15% of the CPU, and when there is no motion it may use much less than that. To assist in achieving the above, additional steps may be employed. First, for each block that must be found in the prior image, it may first be checked if there is enough detail in the block to be able to locate it in the other image (step 630). Blocks that are of a uniform brightness may be ignored. Secondly, there may be no benefit in looking for motion if the item visible in the block has not moved. Therefore, if the block is a close match to the block in the same position in the other image, no searching may be performed (step 632). On the other hand, if the object in the block has moved, it may be desirable to search around or outside of the block in a different image to find or otherwise match the data. However, even if the block has in fact moved, when these two steps decide not to search for it, there can still be other motion in the image sufficient to determine the uniform velocity.

Because searching for a block can require a significant amount of CPU, these pre-checks may reduce, for example, the total amount of CPU required by the Selection Algorithm to between, for example, 2% and 13%—depending upon the amount of motion in the image. This means that at times when there is no motion, little CPU is being used, and at times when there is significant motion, up to 13%, for example, of the CPU may be utilized.

Each selected image may be dewarped and upsampled before it is sent to the object recognition queue. This may be done to improve the performance of the object recognition. Dewarping may remove lens distortion, so that a straight line appears straight in the image. Upsampling may allow the object recognition to do recognition with a higher resolution image, enabling more discriminative recognitions.

The Selection Algorithm according to an embodiment of the present invention may be summarized as follows:

1. (step 602) Images, as they arrive from the camera, may be placed in a queue (input queue).

2. (steps 604 and 606) Each image may be taken from the input queue, and compared to the prior image. To compare, the images are divided into M×N blocks.

3. (steps 630 and 632) Two questions may be asked with regard to each block: (i) Is there enough texture in the block to be able to find it in the other image? and (ii) Has the block moved since the prior image?

4. (step 608) If both answers are yes, the block is processed using the Optical Flow Algorithm. If not, the block may not be used. Therefore, unrecognizable parts as well as parts of the image where there is no motion can be blanked out.

5. (step 612) The optical flow algorithm may provide that each subsequent image is reduced to a matrix of vectors, each representing the number of pixels shifted vertically and horizontally of each block. Therefore, the largest set of blocks that exhibit the same motion (e.g., moved 5 pixels to the right and 1 up) are considered to be representative of the uniform object motion.

6. (steps 614, 616, 618, and 620) The motion over several images may be added together, and when the cumulative horizontal motion reaches a threshold (such as ⅓ of the image width), the image selected to be sent to the object recognition queue, and the cumulative motion counter may be reset to zero. That is, whenever the primary object horizontally moves ⅓ of the image width, the image may be selected to be sent to the object recognition queue.

7. If backtracking is enabled, any back-and-forth motion (such as the cashier on the adjacent lane) can be subtracted.

8. Each selected image may be dewarped and upsampled for optimization, and then sent to the object recognition queue.

Figure 7:
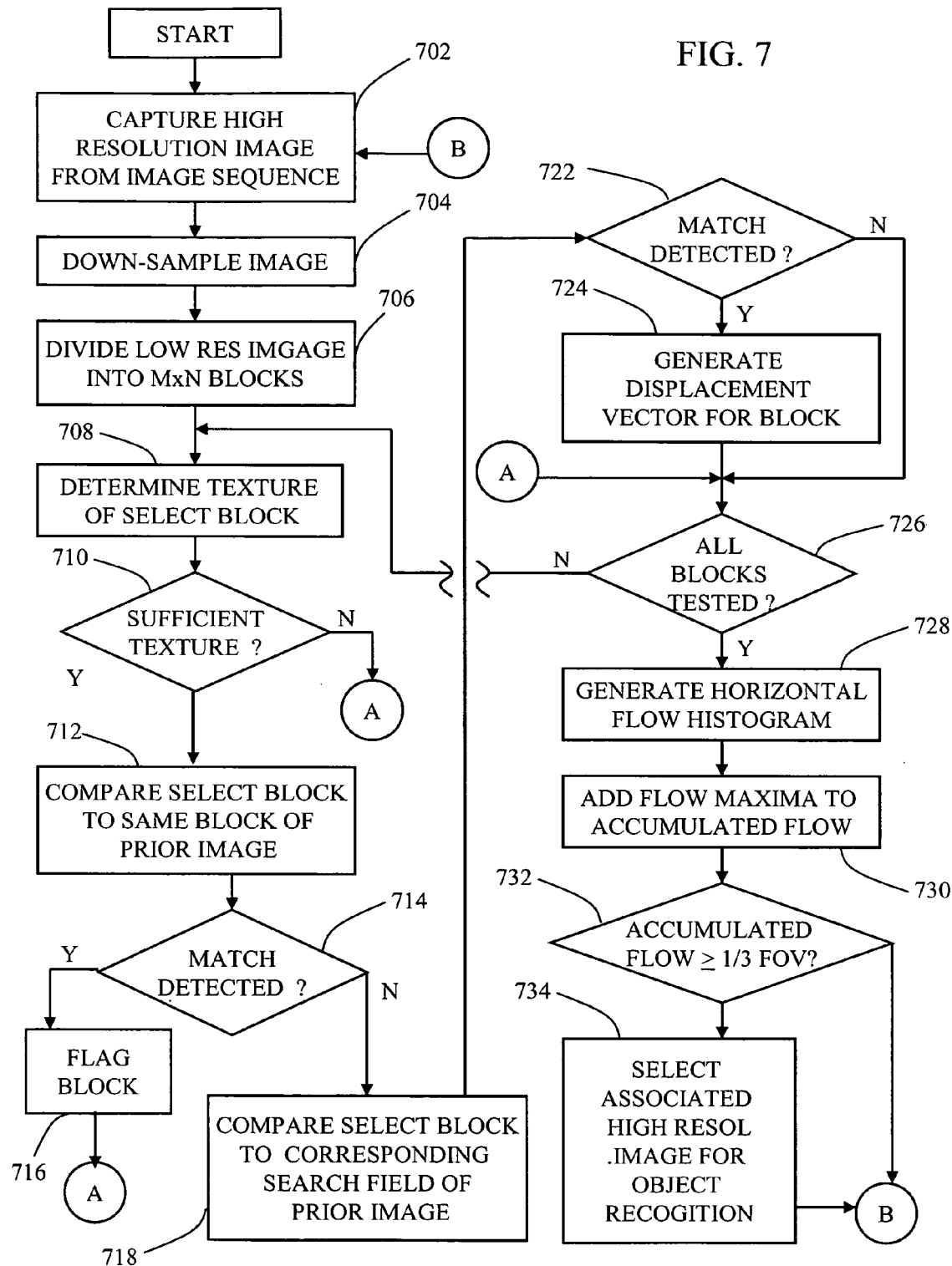
FIG. 7 is a flowchart schematically representing a process in which an image is selected from a sequence of image for purposes of executing object recognition, in accordance with a preferred embodiment of the present invention.

Illustrated in FIG. 7 is a flowchart demonstrating the method of selecting a subset of images with which to conduct object recognition. The selected images are chosen from a plurality of consecutive images received from a still camera or video camera positioned to capture images of one or more objects on a cart as the cart is guided through a check out stand in a grocery store, for example. The images are received from an imaging device, optical flow analysis performed on consecutive images to identify those images in which the cart has advanced a predetermined distance, and select the identified images for further optical recognition processing. In the preferred embodiment, the predetermined distance corresponds to a movement of approximately one third the field of view of the imaging device, which generally results in an object being captured in at least two images selected for image recognition processing. Selecting at least two images with which to perform object recognition processing reduces the chance that an item in the bottom of the basket goes undetected by the feature extractor. Performing object recognition on a subset of the images, in turn, significantly reduces the computational demands on the system.

As illustrated in FIG. 7, black and white images are captured 702 from a 30 Hz video stream or other imaging device with resolution sufficient to support scale-invariant features utilized in the SIFT algorithm. Thereafter, the images are subjected to preprocessing to make real-time optical flow determinations. Although the video camera in the preferred embodiment captures monochromatic images from which grayscale SIFT features may be extracted, the imaging device in some embodiments may be adapted to acquire color images with which color-based object recognition may be performed, example forms of processing including the extraction of color features that may be subjected to SIFT-based object recognition processing.

Since optical flow determinations generally require less image resolution than the SIFT algorithm, the high resolution images provided by the video stream are down-sampled 704 to produce a relatively low resolution image. In the preferred embodiment, the pixel count of the high resolution is reduced by a factor of four in the horizontal and vertical directions. The value of a pixel in the low resolution images is preferably equal to the average of a set of 4 by 4 pixels in the high resolution image. The low resolution image, in turn, is partitioned 706 into a plurality of contiguous data blocks or image subfields, each block having the shape of a polygon such as a square or rectangle. In the preferred embodiment, each of the M×N blocks corresponds to a field of approximately 8 by 8 pixels in the low resolution image.

Each block provides the basis with which to determine if there is movement or flow within the corresponding area of the image. First, the texture of the image data associated with each block is determined to access 708 whether there is sufficient texture in the block to make an accurate optical flow estimate. If the standard deviation of the value of the pixels of a block fails to exceed a determined threshold, the method advances to the next block. If there is sufficient texture, however, decision block 710 is answered in the affirmative and the block of pixels compared 712 to the corresponding block of pixels in the preceding image. A match generally indicates that the block being tested corresponds to background image data or other stationary object instead of a cart or item of interest in motion. When stationary data is detected, decision block 714 is answered in the affirmative and the block flagged 716 to omit it from the flow histogramming described in more detail below.

In the case of non-stationary block, however, the block of image data is searched 718 against the image data of a two-dimensional search field in one or more preceding images. The correlation between the block of the present image and preceding image are computed at each of a plurality of positions across the search field to determine whether the object moved between successive images. The search field is discussed in more detail below in context of FIGS. 9A and 9B.

If the correlation exceeds a determined threshold, a match between the block of the present image and one or more preceding images is confirmed, decision block 722 answered in the affirmative and a displacement vector generated 724 for the block. The displacement vector is a measure of the horizontal and/or vertical flow of the block with respect to the preceding image. Displacement may be measured, for example, in terms of the number of pixels displaced or angle swept per unit time. The process of determining the texture and identifying flow is repeated until each of the blocks of the present image is analyzed and the decision block 726 answered in the affirmative.

At this point, the displacement vectors may be represented as a two dimensional array of velocity measurements from which the presence of the cart may be inferred and distinguished from the cart's user, for example. A cart is generally readily distinguishable from a person, for example, because the motion of a cart is predominantly horizontal and of uniform speed while the motion of a person generally gives rise to a spectrum of horizontal and vertical displacements. To identify the cart in the preferred embodiment, the displacement vectors are compiled 728 into an optical flow histogram, each bin of the histogram including the horizontal component of the displacement vector acquired for each non-stationary block in the present image. While the histogram generally includes a number of modes of flow, the non-zero maxima is generally attributable to the movement of a cart. The horizontal component of the displacement maxima is then added 730 to an accumulated flow measurement representing the amount of flow observed since the last image was selected for object recognition.

If the accumulated flow measured in pixels exceeds one-third the field of view of the camera, for example, decision block 732 is answered in the affirmative and the present image selected for object recognition analysis. As described in detail above, the object recognition generally involves the extraction of graphical features, the application of scale-invariant transform to those features, and the comparison of the transformed features to a database of known features to identify a match.

Figure 8A:
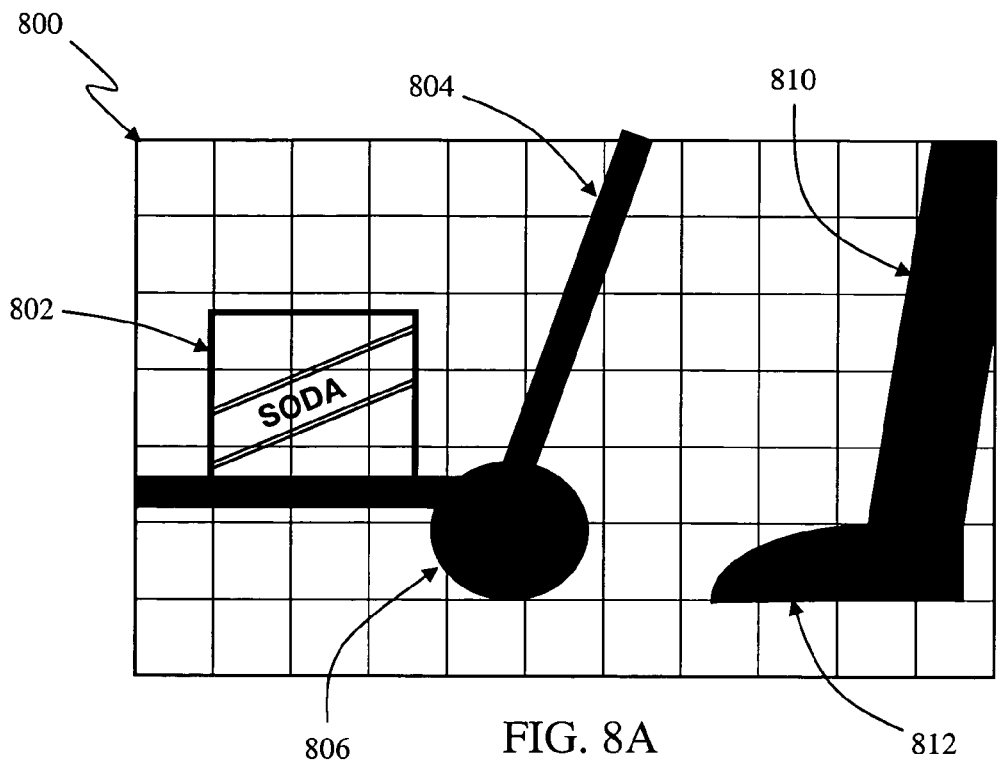
FIGS. 8A and 8B are diagrammatic images of a shopping cart and customer taken at two instances in time, in accordance with a preferred embodiment of the present invention.
Figure 8B:
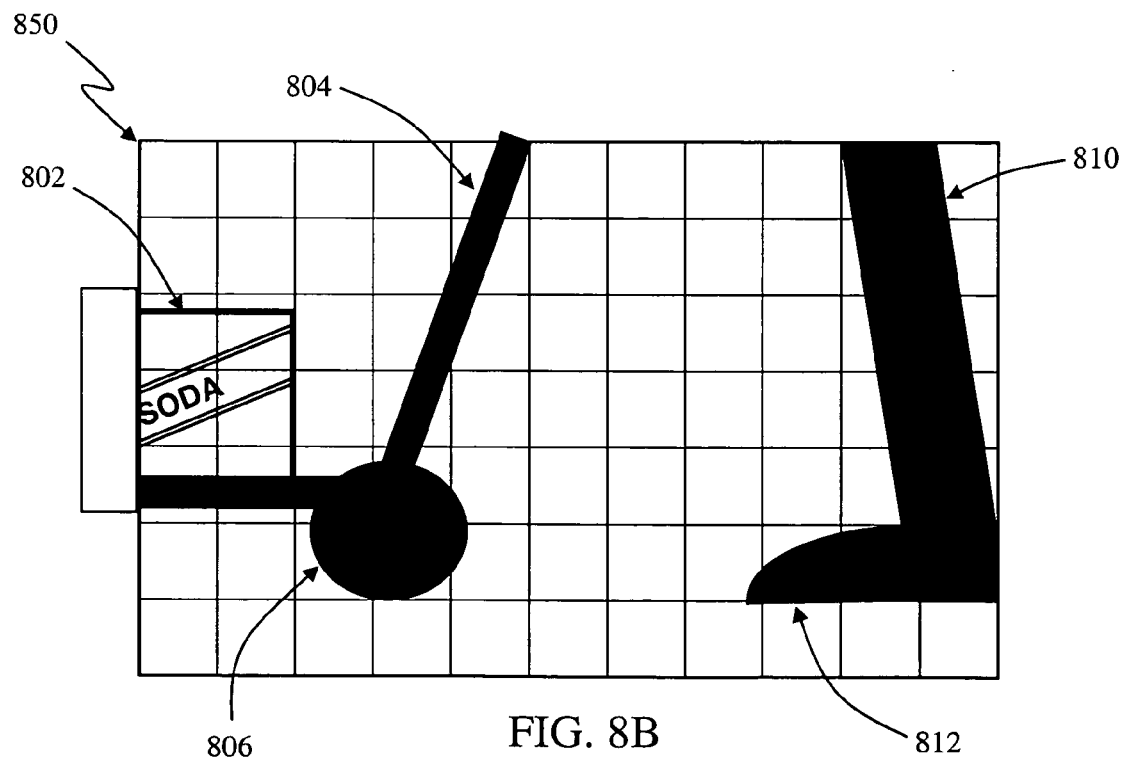

Illustrated in FIGS. 8A and 8B are two consecutive images of a cart being pushed through an aisle as viewed by a camera positioned in proximity to the cart's bottom basket. Both the prior image 800 and present image 850 include a package of soda 802 on a cart with a frame 804 and wheel 806. The cart is operated by a person whose leg 810 and foot 812 appear in the camera's field of view. As the cart advances through the aisle between the successive images, the cart and item 802 progress with a uniform speed in a predominately horizontal direction. The person, in contrast, gives rise to a variety of horizontal and vertical motion. In particular, the foot 812 in contact with floor remains stationary while the leg 810 pivots about the ankle. The velocity associated with the blocks coinciding with the leg, therefore, increases from linearly from the foot 812 to the person's knee. As a results, the uniform flow of the cart generally dominates the bins of the optical flow histogram associated with each image.

Illustrated in FIG. 9A is a representation of a single block 900B of image data from FIG. 8B for which the optical flow is generated. Illustrated in FIG. 9B is a representation of the associated search field 950 of image data from FIG. 8A against which the block of FIG. 9A is compared. The search field 950 in the preferred embodiment is at least as large as a single block and has an elongated shape in which the horizontal length exceeds the vertical height. The length of the search field is preferably selected to correspond to the observed displacement of a cart moving at approximately one (1) meter per second at a distance of approximately 30 centimeters from the camera. The height of the search field is preferably selected large enough to account for adverse imaging conditions while excluding other forms of vertical motion not associated with cart movement. Adverse imaging conditions that may result in the apparent vertical displacement of a cart include 1) the apparent increase in size of a cart or item as it approaches the camera, 2) the apparent decrease in size of a cart or item as it retreats from the camera, 3) pin cushion type distortion present in some camera systems, and 4) changes in apparent cart size due to diagonal movement of the cart in an aisle. If the data of the block 900B is highly correlated to or otherwise matches a portion of the preceding image data in search field 950, a displacement vector representing the optical flow is generated. In this example, the displacement vector 960 represents the distance the item 802 has moved in the horizontal direction between successive images in FIGS. 8A and 8B.

Illustrated in FIG. 10 is a two-dimensional array of displacement vectors corresponding to the image 850 of FIG. 8B. The displacement vectors, represented by arrows indicating direction and magnitude of flow, include a first set of arrows associated with the cart and package in the left portion of the image and a second set of arrows associated with the person's leg in the right portion of the image. As will be appreciated by one skilled in the art, the first set of displacement vectors in proximity to vector 960 are of uniform length indicating uniform velocity in the horizontal direction. The second set of displacement vectors are of variable velocity and indicate various degrees of horizontal and vertical motion. The blocks associated with the foot are illustrated with strike marks 970 to indicate that they were determined to be stationary during the period in question. The empty blocks indicate stationary background or areas of insufficient texture. In some embodiments, the portions of the high resolution images associated with the blocks with insufficient texture or absence of flow may be zero'ed out before being subjected to object recognition in order to prevent irrelevant features from being extracted. In some embodiments, blocks of insufficient texture and non-zero flow are checked or otherwise flagged 980 if immediately adjacent to a block with flow so that the corresponding image data may be retained and subjected to object recognition analysis.

Figure 11:
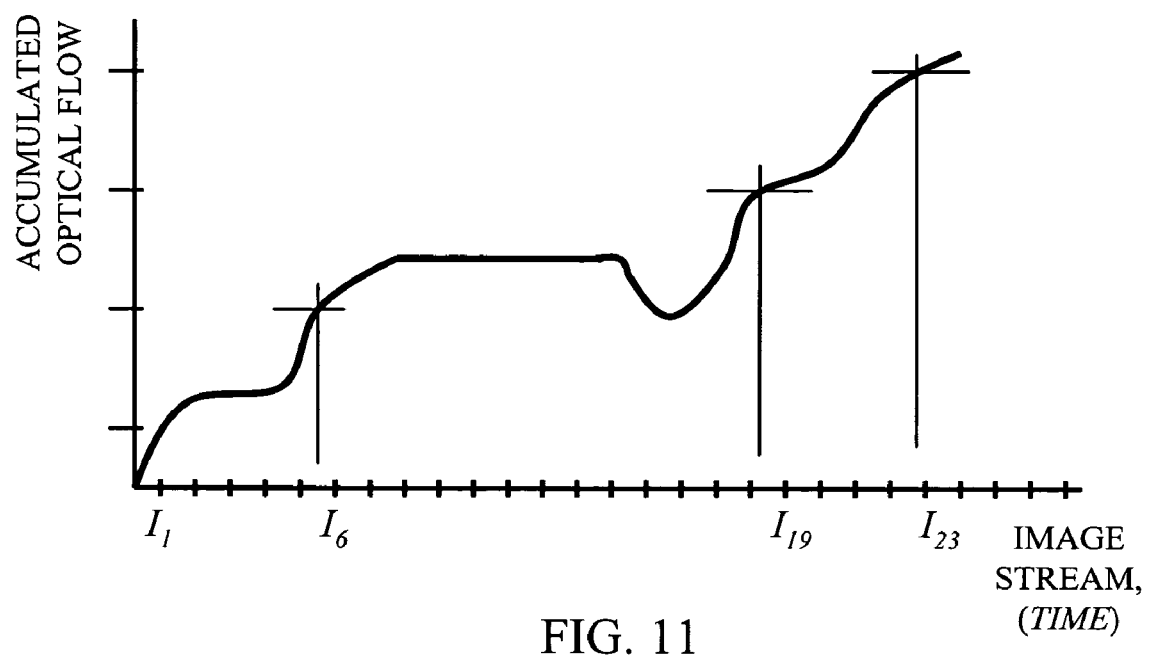
FIG. 11 is a diagrammatic illustration of an accumulated optical flow measurement and the corresponding images selected for object recognition.

Illustrated in FIG. 11 is a graphical representation of the accumulated optical flow over multiple image sequences. As will be appreciated by one skilled in the art, the ascending portions of the curve corresponding to times in which the cart is moving in the forward direction in the aisle, the horizontal portion corresponds to the time when the user and cart are within the field of view of the camera but stationary, and the descending portion of the curve correspond to a time when the cart was briefly pulled backwards in the aisle. The accumulator accounts for these conditions and selectively identifies those images ($I_1$, $I_6$, $I_{19}$, $I_{23}$) in which the cart has been displaced a predetermined amount. As indicated by the tick marks on the vertical axis, images are selected when the cart has advanced one third the field of view, which ensures that an image of an item on the cart is captured in at least two and approximately three images on average while avoiding the need to implement object recognition with respect to redundant intermediate images.

It should be understood, of course, that the foregoing relates to exemplary embodiments of the invention and that modifications may be made without departing from the spirit and scope of the invention as set forth in the following claims.

What is claimed is:

1. A method for determining optical flow of a region of interest, the method comprising the steps of:
    capturing with an imager a plurality of images of one or more objects on a moveable structure, the plurality of images comprising a first image and a second image;
    partitioning the second image into a plurality of data blocks;
    comparing a set of one or more of said blocks with at least a portion of the first image:
    determining the displacement between the first image and block for each of the blocks in which a match is detected;
    identifying the non-zero displacement common to the most blocks; and
    associating the most common displacement with the moveable structure and one or more objects.

2. The method of claim 1, wherein the movable structure is a shopping cart.

3. The method of claim 2, wherein one or more of the steps are executed by a processor operatively coupled to a checkout terminal.

4. The method of claim 2, wherein the step of comparing comprises the step correlating the set of blocks with an associated portion of the first image.

5. The method of claim 4, wherein the associated portion of the first image is a search field.

6. The method of claim 5, wherein the search field has a width sized to capture substantially all horizontal motion of the cart.

7. The method of claim 6, wherein the search field has a height sized to exclude substantially all human motion.

8. The method of claim 1, wherein the plurality of images are captured by a video camera.

9. The method of claim 8, wherein the video camera is directed to a cart bottom of basket.

10. The method claim 1, wherein the second image is down-sampled prior to the partitioning step.

11. The method of claim 1, further comprising the step of determining a measure of texture in each block after the step of partitioning.

12. The method of claim 11, wherein the set of blocks consists of those blocks for which the measure of texture exceeds a first threshold.

13. The method claim 1, wherein the method further comprises the step of generating a histogram for binning the displacement of each of the set of blocks.

14. The method of claim 1, further comprising the step of identifying the one or more objects from the blocks associated with the most common displacement.

15. The method of claim 14, wherein the step of identifying the one or more objects comprises:
   extracting one or more visual features from the blocks associated with the most common displacement; and
   comparing the one or more visual features to a database of known objects.

16. The method of claim 15, wherein the visual features are scale-invariant feature transformation (SIFT) features.

17. A system for measuring optical flow of a region of interest, the system comprising:
   a visual sensor for capturing a plurality of images of one or more objects on a moveable structure, the plurality of images comprising a first image and a second image:
   a processor adapted to:
     a) partition the second image into a plurality of blocks;
     b) compare a set of one or more of said blocks with at least a portion of the first image;
     c) determine a displacement between the first image and block for each of the blocks in which a match is detected;
     d) identify the non-zero displacement common to a set of blocks; and
     e) identifying one or more of the objects from the blocks associated with the most common displacement.

18. The system of claim 17, wherein the identified non-zero displacement is common to the greatest number of blocks of the second image.

19. A method of selecting Images of Interest, the method comprising:
   capturing with an imager a plurality of images of one or more objects on a moveable structure;
   partitioning each of the plurality of images into a plurality of blocks;
   generating a displacement measurement for one or more of the blocks based on at least one preceding image;
   identifying, for each image, the displacement measurement common to the most blocks;
   adding the identified displacement measurement to a cumulative displacement measurement; and
   selecting each image for which the cumulative displacement measurement exceeds a predetermined value with respect to a previously selected image.

20. The method of claim 19, wherein the predetermined value corresponds to approximately one third a field of view of a camera for capturing the plurality of images.

21. The method of claim 19, further comprising the step of identifying the one or more objects from the selected images.

22. The method of claim 21, wherein the step of identifying the one or more objects from the identified images is based on scale-Invariant feature transformation (SIFT) features.

23. The method of claim 19, further comprising the step of down-sample each of the plurality of images prior to the partitioning step.

24. The method of claim 23, further comprising the step of identifying the one or more objects from the captured images associated with the selected images.

25. A method of selecting images of interest, the method comprising:
   a visual sensor for capturing a plurality of images of one or more objects on a moveable structure;
   a processor adapted to:
     a) partition each of the plurality of images into a plurality of blocks;
     b) generate a displacement measurement for one or more of the blocks based on at least one preceding image;
     c) identify, for each image, the displacement measurement common to the most blocks;
     d) add the identified displacement measurement to a cumulative displacement measurement; and
     e) select each image for which the cumulative displacement measurement exceeds a predetermined value.

* * * * *